US006485655B1

(12) United States Patent
Das et al.

(10) Patent No.: US 6,485,655 B1
(45) Date of Patent: Nov. 26, 2002

(54) METHOD AND APPARATUS FOR RETAINING AN INTERNAL COATING DURING ARTICLE REPAIR

(75) Inventors: Nripendra Nath Das, West Chester, OH (US); Stephen Joseph Ferrigno, Cincinnati, OH (US); Jim Dean Reeves, Cincinnati, OH (US); Michael Glenn Gordon, Springdale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/921,501

(22) Filed: Aug. 2, 2001

(51) Int. Cl.[7] .............................................. B32B 35/00
(52) U.S. Cl. ........................... 216/45; 216/51; 156/344; 156/345.19; 156/345.3; 156/29; 156/402.6
(58) Field of Search ...................... 216/45, 51; 156/344, 156/345.19, 345.3; 29/402.6

(56) References Cited

U.S. PATENT DOCUMENTS

| | | | |
|---|---|---|---|
| 5,614,054 A | 3/1997 | Reeves et al. | 156/344 |
| 5,728,227 A | 3/1998 | Reverman | 134/2 |
| 5,792,267 A | 8/1998 | Marszal et al. | 118/500 |
| 6,039,810 A | 3/2000 | Mantkowski et al. | 118/715 |
| 6,224,673 B1 | 5/2001 | Das et al. | 118/500 |

Primary Examiner—Richard Bueker
(74) Attorney, Agent, or Firm—David L. Narciso; Lee H. Sachs

(57) ABSTRACT

An internal coating on an internal passage wall exposed at a passage opening through an article external surface is protected from removal during repair of the article, including removal of at least a portion of an external coating, by a masking assembly disposed about the passage opening. The masking assembly comprises a masking member and a substantially flexible seal, substantially inert to a coating removal medium for the external coating. The masking member is shaped for disposition about the passage opening across a gap between the external surface and the masking member. The substantially flexible seal is disposed across the gap substantially to seal the gap.

7 Claims, 3 Drawing Sheets

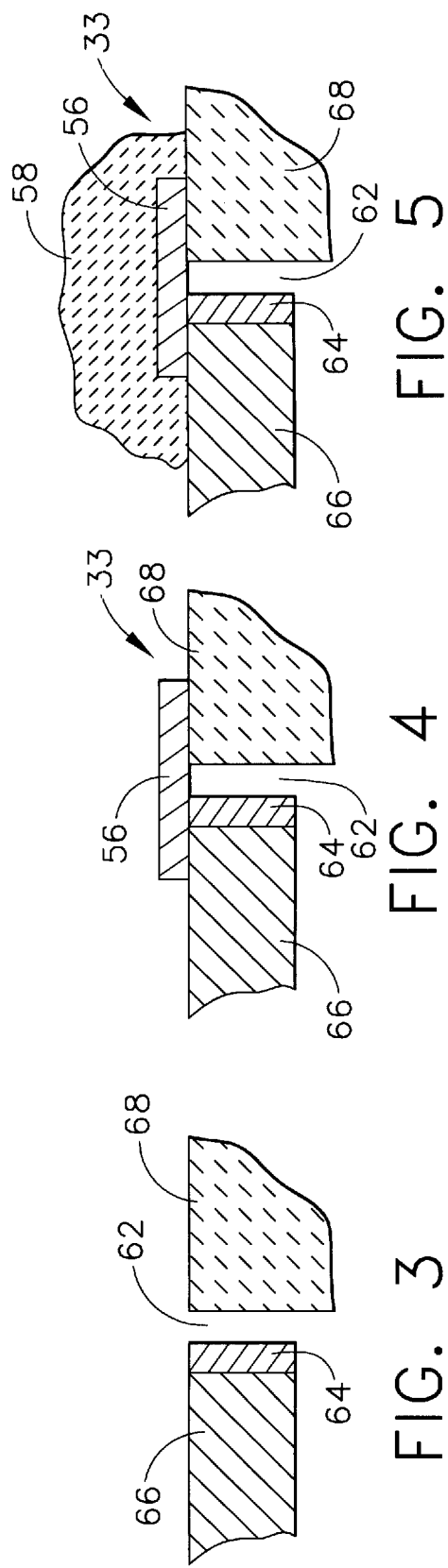

METHOD AND APPARATUS FOR RETAINING AN INTERNAL COATING DURING ARTICLE REPAIR

BACKGROUND OF THE INVENTION

This invention relates to repair of an article that includes a protective internal coating on an internal passage of the article. More particularly, it relates to retention of the internal coating while removing a protective coating on an external surface of the article.

Components of power generation apparatus, for example a turbine engine, operating under relatively high temperature, strenuous environmental conditions generally include surface protection or coatings as a protective barrier between an operating fluid and an article substrate material. One example is a turbine section component of a gas turbine engine operating downstream of a combustor generating products of combustion in an oxidizing atmosphere. Components such as turbine blades and vanes generally are made of a high temperature alloy and are air cooled through at least one internal passage. However, it is common practice to include for additional protection on such component at least an external environmental resistant coating or coating system and frequently an environmental resistant coating on the internal passage.

Examples of high temperature environmental resistant coatings include commercial diffusion aluminide type of coatings, well known and widely used in the gas turbine engine art. Such coatings include Al or an alloy including Al applied to a surface to be protected and heated to diffuse at least a portion of the Al into a substrate of an article. U.S. Pat. No. 3,667,985—Levine et al. describes a form of such an aluminide coating commercially available as Codep aluminide coating. Another type of protective coating widely used commercially with gas turbine engine articles is the M—Cr—Al overlay type of coating in which "M" is at least one of Fe, Co, and Ni, and in which at least one other alloying element, typically Y, has been included. Still another widely used type of aluminide coating used in the gas turbine engine art is the Pt—Al type of coating in which Al is diffused into a Pt layer first deposited on a substrate. Types of such environmentally resistant aluminide coatings, in addition to being used externally, frequently are deposited on a surface of an internal passage of an article, for example on the surface of an internal air cooling passage of a turbine blade or vane.

In some forms of external high temperature environmental resistant coatings, an aluminide coating is used as a bond coat between a substrate and an outer ceramic base coating sometimes referred to as a thermal barrier coating (TBC). Various ceramic materials have been used in the ceramic layer, for example zirconia stabilized with yttria, and magnesia stabilized with yttria.

Periodically, as a result of operation under such strenuous operating conditions including impact on the component surface by fluid borne particles or objects, it is necessary to repair such a component. As practiced in the gas turbine engine art, some repair has required removal of at least a portion of the external coating to enable repair of the coating and/or repair of underlying portions of the component. For example, such repair practice has included at least one of removal and replacement of at least a portion of the external coating, and replacement of a portion of the substrate, for example by welding, brazing, etc. One form of external coating removal, for the aluminide type as well as for the TBC type of coating, has included exposure of the external coating to a medium of a reducing gas including a halide ion or gas, typically of fluoride. Examples of such removal methods are described in U.S. Pat. No. 5,614,054—Reeves et al. (patented Mar. 25, 1997); and U.S. Pat. No. 5,728,227—Reverman (patented Mar. 17, 1998).

Although removal of at least a portion of an external coating can be necessary in the repair of an article, removal of an internal coating on a surface of an internal passage generally is not required in the repair procedure. Exposure of the internal coating to the medium that will remove the internal coating along with the external coating not only is not necessary, but also such removal, requiring subsequent replacement of the internal coating, adds to the cost of repair of the article.

BRIEF SUMMARY OF THE INVENTION

Forms of the present invention provide a method and apparatus for use in repairing an article that includes on an external surface an external coating at least a portion of which is removed by exposure to a coating removal medium. The article includes an internal passage with a passage opening through the external surface, the passage including an internal passage coating on a passage surface. In a method form, the internal coating is isolated from the coating removal medium by surrounding and isolating the passage opening, and thereby the internal coating, with a masking assembly before the external coating is removed. Such masking assembly includes a masking member substantially inert to the coating removal medium and disposed, for example within a cavity in the masking member, about the passage opening across a gap between the external surface and the masking member. The masking assembly includes a flexible seal disposed across the gap between the masking member and the external surface, thereby isolating the passage opening from the coating removal medium. Then the method of removing at least a portion of the external coating is conducted by exposing the external coating to the coating removal medium, the internal coating being protected and retained on the surface of the internal passage by the masking assembly.

BRIEF DESCRIPTION OF THE DRAWINGS

FIG. 3 is an enlarged diagrammatic, fragmentary, sectional view of a portion of an article portion, such as the support of the type shown in FIG. 2, disposed across a gap with a portion of a masking member.

FIGS. 4 and 5 are enlarged, diagrammatic, fragmentary, sectional views of forms of a flexible seal disposed across the gap of FIG. 3.

DETAILED DESCRIPTION OF THE INVENTION

Typical turbine engine components to which forms of the present invention relate include gas turbine engine blades and vanes, for example of the type shown in such U.S.

Patents as U.S. Pat. No. 5,458,461—Lee; and U.S. Pat. No. 5,813,832—Rasch et al., air cooled through an internal passage, frequently of complex configuration. A practice in the repair of airfoils of such gas turbine engine components is first to remove at least a portion of an external or outer environmental resistant coating. Such coating removal facilitates subsequent effective repair of the coating and/or the substrate structure of the component, for example by at least one of coating repair or replacement, and repair of the substrate structure.

One type of method for coating removal includes exposure to a reducing gaseous medium including a halide gas or ions, typically a fluoride gas in mixture with hydrogen gas. Forms of this type of medium and method are described in detail in the Reeves et al. and Reverman patents identified above. Generally, such airfoils operating at relatively high temperatures under strenuous environmental conditions include a protective coating on internal passage surfaces. Typically, such internal coating includes Al and is of a type that can be removed or depleted by exposure at coating removal temperatures to such a coating removal medium as a reducing mixture including fluoride. Forms of the present invention isolate, retain and protect such internal coating during removal of an external coating.

Figure 1:
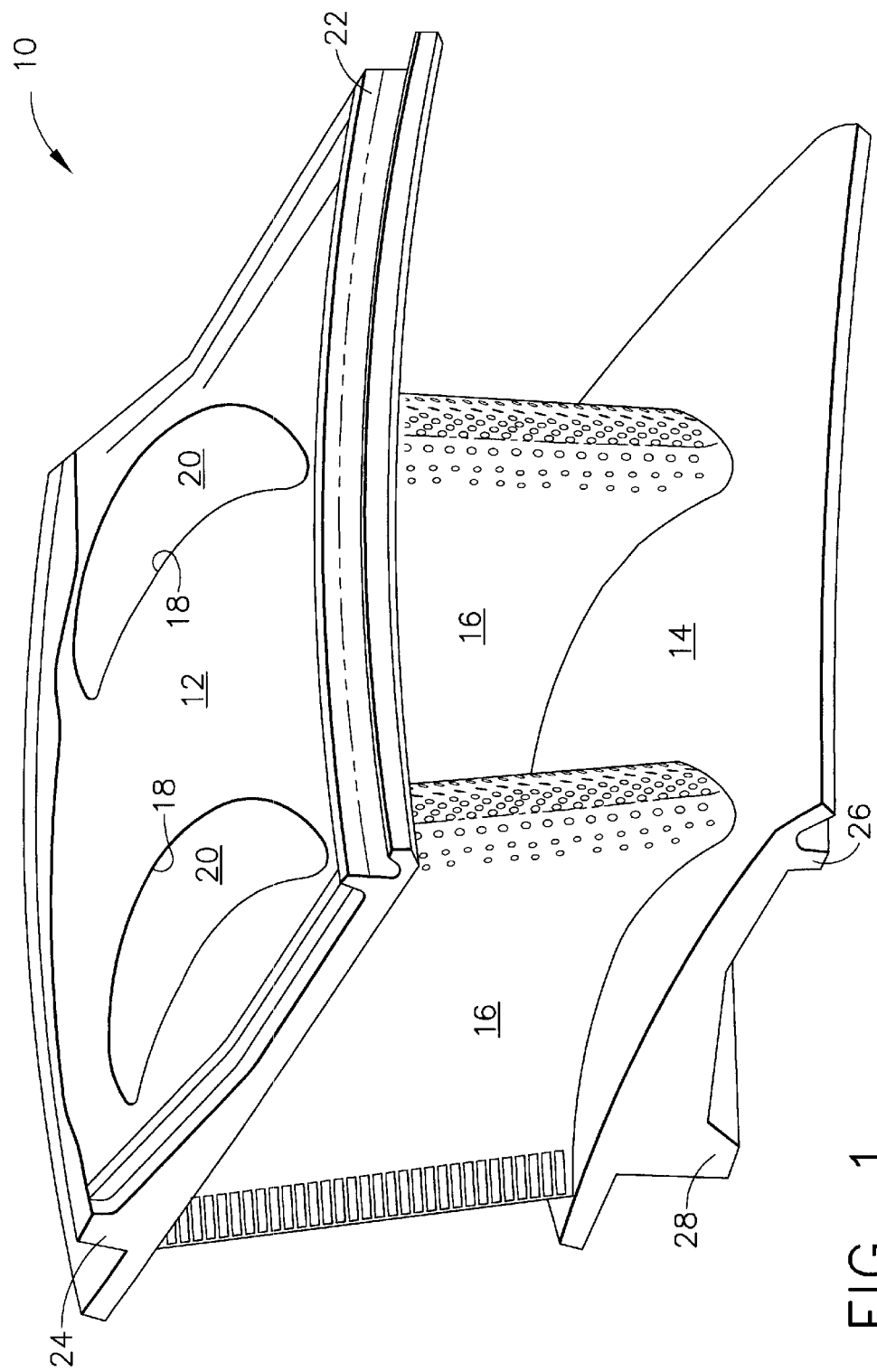
FIG. 1 is a perspective view of one form of a turbine engine turbine vane segment including a plurality of airfoil members carried between inner and outer support or band-like members and air-cooled through an internal passage with openings through the supports.

The present invention will be more fully understood by reference to the drawings. FIG. 1 is a perspective view of a gas turbine engine turbine vane segment shown generally at 10 and made of a high temperature alloy, for example one based on at least one of Fe, Co, and Ni. Vane segment 10 includes an outer support or band 12, an inner support or band 14 and a plurality, in this example two, of typical air cooled vane airfoils 16 carried by and between spaced-apart inner and outer supports 12 and 14, for example by welding or brazing. Airfoils 16 are air cooled through a hollow interior with internal passages, for example as defined by internal vane walls a portion of which is shown at 18 extending through openings in the supports, shown at 20 through outer support 12. Generally, inner and outer supports 12 and 14 include various protrusions and ribs, for example for use in assembly of the vane segment with a cooperating component, for example with other vane segments of a nozzle assembly, nozzle support structure, etc. Such protruding features are disposed about the radially outer and radially inner portions of the supports, away from the engine flow path. In FIG. 1, some of such ribs on outer band or support 12 are shown at 22 and 24. Similarly, inner band 14 includes ribs 26 and 28.

Figure 2:
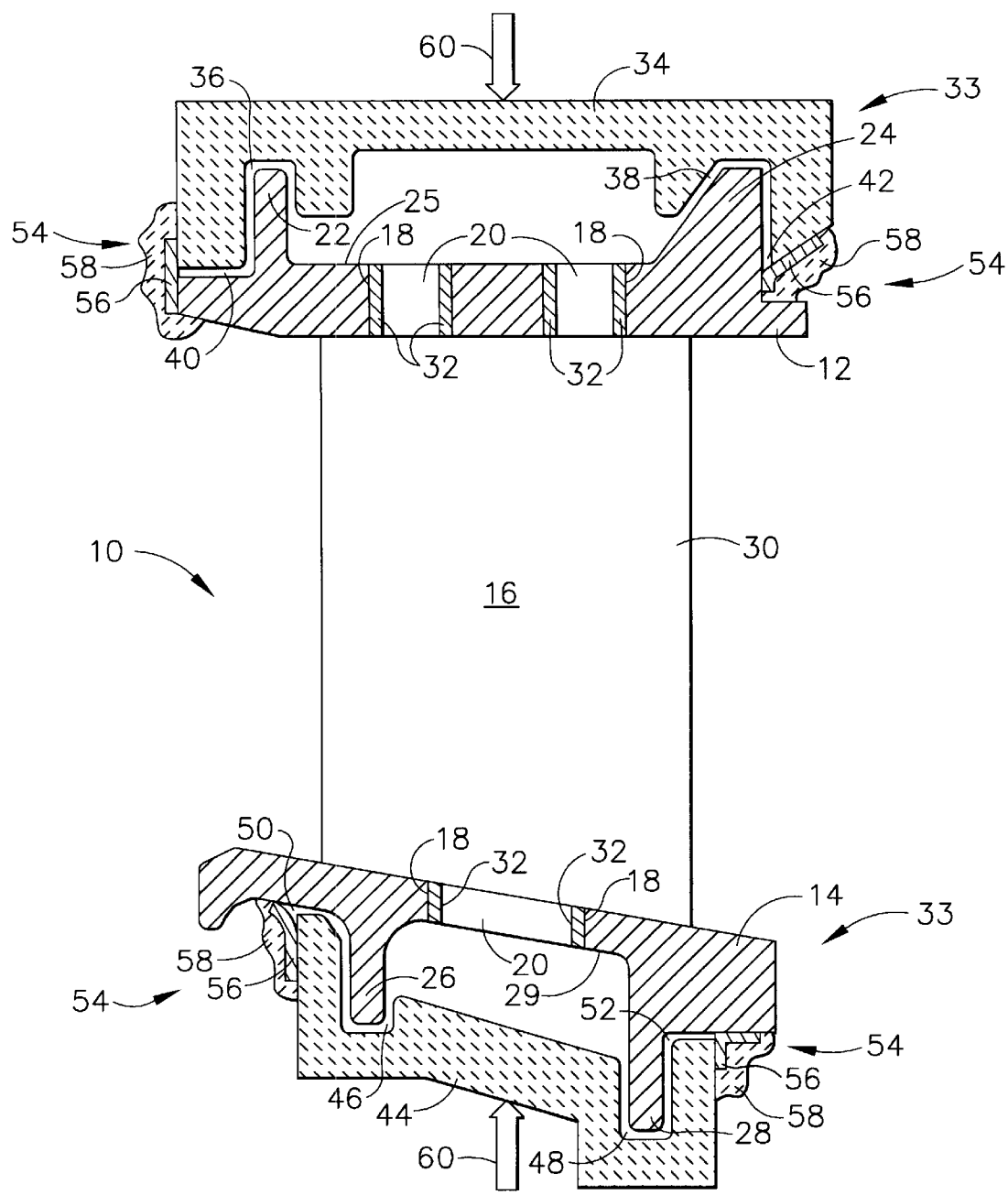
FIG. 2 is a diagrammatic, partially sectional view of a turbine vane segment, similar to the segment of FIG. 1, showing a form of the masking assembly of the present invention disposed about openings in the supports.

As was discussed above, it is common practice to protect the outer surface of airfoil 16 with an environmental resistant coating, for example a diffusion aluminide, an overlay or a TBC coating system. Also, wall 18 defining at least a part of an internal air cooling passage 20 has been coated with an environmental resistant coating, typically an aluminide. The diagrammatic, partially sectional view of FIG. 2 shows a vane segment similar to that of FIG. 1, including airfoil 16, for convenience not shown in cross section, carried by and between spaced apart outer support 12 and inner support 14, shown in cross section. Airfoil 16 includes thereon an environmental resistant coating 30. Internal passage walls 18 shown through openings 20, shown diagrammatically in FIG. 2 to comprise a plurality of spaced-apart opening portions in outer band 12, and opening 20 in inner band 14 include thereon an environmental resistant coating 32. Shown in section in FIG. 2 are ribs 22 and 24 protruding from the outer surface 25 of outer band or support 12, and ribs 26 and 28 protruding from the outer surface 29 of inner band or support 14.

During one type of repair of vane segment 10, for example to repair damage to the substrate of airfoil 16 or to replace at least a portion of coating 30, or both, on airfoil 16, it was necessary to remove at least a portion of coating 30. However, removal of inner coating 32 was not required for such repair. Retention of coating 32 was desired for continued protection, during service operation, of internal passages defined at least in part by walls 18. Removal of coating 32 would require its replacement, adding to the cost of the repair. As identified above, one form of removal of coating 30 from vane 16 was through exposure at an elevated temperature to a commercially used coating removal medium of a reducing gas including a halogen, for example fluoride ion or gas.

Forms of the present invention avoid removal of internal coating 32 during exposure of outer coating 30 to a coating removal medium by isolating the internal coating at openings 20. Coating 32 on walls 18 was isolated from the coating removal medium by a masking assembly made of components substantially inert to the coating removal medium. As used herein, a material inert to a medium is intended axis to include within its meaning one that sometimes is referred to in the art as a "getter", for example one that preferentially reacts with a medium. The masking assembly comprised at least one masking member in combination with a flexible seal across a gap between the masking member and the article to inhibit flow of coating removal medium to internal coating 32.

One embodiment of such a masking assembly for an article, for example a vane segment with a plurality of openings 20 at spaced-apart portions of the article, is shown generally at 33 in FIG. 2. In that embodiment, masking assembly 33 comprises a plurality of masking portions, one at outer support 12 and one at inner support 14, both about and surrounding passage openings 20, which can comprise a plurality of opening portions. In that embodiment, an outer mask member 34, for example of graphite substantially inert to a reducing gas comprising fluoride gas in hydrogen, was shaped to register in mask member recesses 36 and 38 respectively with outer ribs 22 and 24 of outer support 12. When ribs 22 and 24 were disposed in recesses 36 and 38, gaps 40 and 42, defining a labyrinthine path in this embodiment, were provided, respectively, between the ribs and walls of the recesses to enable differential thermal expansion between materials of different thermal expansion characteristics during the coating removal process. Typically, such gaps have been in the range of about 0.02–0.04". Similarly at inner support 14, an inner mask member 44, spaced apart from outer mask member 34, was shaped to register in recesses 46 and 48 respectively with inner ribs 26 and 28 of inner support 14. Gaps 50 and 52 were provided, also defining a labyrinthine path as described above, between the ribs and the walls of the recesses.

Masking assembly 33 included, for each portion, a flexible seal shown generally at 54 over and sealing an entry of each of the gaps. In the embodiment of FIG. 2, flexible seals 54 comprise a metal foil 56 bonded across each gap. For example, such a foil can be a high temperature foil based on at least one element such as Fe, Co and Ni, capable of withstanding the temperature at which coating removal is conducted and substantially inert to the coating removal medium. In one form, such a foil included an adhesive on a surface to facilitate such bonding. In addition in that embodiment, a flexible high temperature putty-like material 58 was disposed over the foil 56 in the event foil 56 deforms, such as buckling, during practice of a relatively high temperature coating removal process. Forms of such high temperature putty used in the evaluation of the present invention included a powder of at least one of metal, metal oxide, ceramic and graphite, in an organic binder, one form of which commercially is available as B-200 organic binder. The high temperature putty is capable of withstanding coating removal processing, although the putty has been observed to harden during processing as a result of loss of volatile components. Forms of such a putty are described in more detail in U.S. Pat. No. 6,224,673—Das et al., for example in the paragraph bridging columns 7 and 8. Maintaining the masking assembly in registry, as described, was a holding means, represented by force arrows 60 to secure together the masking assembly and vane segment during coating removal. For example, such holding means can be appropriately shaped fixtures or clamps. In one form of the present invention, a plurality of segments, for example each of an embodiment similar to the segment of FIG. 1, each including inner and outer spaced-apart supports or bands between which are carried at least one airfoil, were assembled together for external coating removal, for example in a circumferential or substantially circular assembly in a nozzle shape. In that example, inner and outer masking members of the masking assembly, in some forms with the masking members conveniently segmented for ease of assembly, were assembled at each of the inner and outer bands in a substantially circular array and held in registry with the segments by inner and outer fixture holding bands. Protrusions from the inner and outer bands were disposed in recesses in the masking members.

The enlarged fragmentary sectional views of FIGS. 3, 4, and 5 show, diagrammatically, a typical gap 62 between an internal coating 64 on article portion 66 and a masking member 68. One embodiment of masking assembly 33 of the present invention is shown in FIG. 4, including metal foil 56 bridging and sealed across gap 62 between article portion 66 and masking member 68 to isolate coating 64. Another embodiment, including the embodiment of FIG. 4, is shown in FIG. 5. That embodiment includes putty-like material 58 disposed in combination over metal foil 56 to enclose metal foil 56 and isolate coating 64.

During evaluation of the present invention, a gas turbine engine turbine nozzle segment generally of the type shown in FIG. 1 was inspected for damage during service operation. In this example, the nozzle segment included six airfoils made from a high temperature Ni base superalloy commercially referred to as Rene' N5 alloy, bonded between inner and outer support bands made of a Ni base alloy commercially available as Rene' 77 alloy. In some other forms of gas turbine engine nozzle segments, Co base alloys, such as the commercially used X-40 alloy, are used in the segments, for example as one or more of the support bands. In this example, the airfoils included an external environmental resistant commercial TBC coating system comprising zirconia stabilized with yttria and bonded to the substrate of the airfoil through a metallic bond coat of the above described MCrAlY type of coating. The airfoils included an internal air cooling passage open through each of the inner and outer support bands and coated with an internal environmental resistant coating of aluminide. It was observed during inspection that a crack had developed in an airfoil during service operation. Repair of the crack was required, for example by welding and/or brazing. To enable such repair, it was required that at least a portion of the external coating be removed. However, removal of the internal coating was not required and, if removed, would have to be replaced, thereby adding to the cost of the repair.

In order to avoid removal of the internal coating during external coating removal, a form of the masking assembly of the present invention was provided and applied as described in connection with FIG. 2 to isolate the internal coating from a coating removal medium. A pair of masking members, made of graphite, each was shaped and disposed spaced apart, as shown in FIG. 2, to register with ribs protruding from the inner and outer support bands to surround and isolate the internal passage openings through the supports, across a gap between such structures. The spaced-apart graphite masking members were secured with the vane segment with a clamping fixture. In another embodiment in which a nozzle assembly of a plurality of circumferentially disposed or ring of segments was repaired, inner and outer holding or clamping rings were applied to secure the masking members with the segments.

To seal the gaps and isolate the internal coating, a flexible seal comprising a Ni foil with an adhesive on one side was bonded by pressing the foil across the gap. Then a putty comprising about 90 wt. % Ni powder in the above identified B-200 organic binder matrix was applied over the Ni foil to provide a masking assembly.

With the masking assembly form of the present invention disposed as described above, the external TBC coating was removed from the external surface of the airfoils. Removal was accomplished by exposing the masked assembly to a coating removal medium of a reducing mixture of about 6–13 wt. % of hydrogen fluoride gas with the balance principally hydrogen gas. Exposure was at a temperature in the range of about 1600–2000° F. for about 2–10 hours. After such exposure, the masking assembly was removed from about the vane segment. It was observed that the internal coating was retained on the internal passages. Thereafter, damage to the airfoil was repaired.

The present invention has been described in connection with specific examples and combinations of materials and structures. However, it should be understood that they are intended to be typical of rather than in any way limiting on the scope of the invention. Those skilled in the various arts involved, for example relating to gas turbine engines and repair of their components, will understand that the invention is capable of variations and modifications without departing from the scope of the appended claims.

What is claimed is:

1. A method for repairing an article including an external coating on an external surface, in which method at least a portion of the external coating is removed by exposure to a coating removal medium, the article including at least one internal passage having a passage opening through the external surface, the passage including an internal coating on a passage wall, comprising the steps of:

isolating the internal coating from the coating removal medium about the passage opening by providing a masking assembly comprising a masking member and a substantially flexible seal, each of a material substantially inert to the coating removal medium;

disposing the masking member about the passage opening across a gap between the masking member and the external surface;

disposing the substantially flexible seal across the gap substantially to seal the gap; and then, exposing the external coating to the coating removal medium while retaining the internal coating on the passage wall.

2. The method of claim 1 in which the internal passage includes a first passage opening through a first external surface and a second passage opening through a second external surface spaced-apart from the first external surface, in which:

the internal coating is isolated from the coating removal medium by providing a masking assembly comprising a first masking member and a first substantially flexible seal for the first passage opening and a second masking member and a second substantially flexible seal for the second passage opening;

disposing the first masking member about the first passage opening across a first gap and the second masking member about the second passage opening across a second gap;

disposing the first substantially flexible seal across the first gap and the second substantially flexible seal across the second gap; and then, exposing the external coating to the coating removal medium.

3. The method of claim 2 in which:

at least one of the first and second passage openings comprises a plurality of spaced-apart opening portions; and, the respective masking assembly for a passage opening is disposed about the respective plurality of opening portions.

4. The method of claim 2 for repairing an article in the form of at least one turbine engine vane segment, a segment comprising at least one airfoil having on an external surface of the airfoil an external coating at least a portion of which is to be removed, the airfoil carried between spaced-apart first and second supports, the airfoil including at least one internal passage having a first opening through a first external surface of the first support and a second opening through a second external surface of the second support, the internal passage including an internal coating on a passage wall, in which method the internal coating is isolated from the coating removal medium by:

disposing the first masking member at the first external surface about the first opening in the first support across a first gap between the first external surface and the first masking member;

disposing a first substantially flexible seal across the first gap;

disposing the second masking member at the second external surface about the second opening in the second support across a second gap between the second external surface and the second masking member;

disposing a second substantially flexible seal across the second gap; and then, exposing the external coating to the coating removal medium while retaining the internal coating on the internal passage wall.

5. The method of claim 4 in which the article is in the form of a plurality of turbine engine vane segments wherein:

the plurality of segments is assembled substantially into a ring of segments;

the first masking member is disposed at the first external surfaces of the segments across the first gap;

the first substantially flexible seal is disposed across the first gap;

the second masking member is disposed at the second external surfaces of the segments across the second gap;

the second substantially flexible seal is disposed across the second gap; and, the first and second masking members are held in registry with the segments by a holding means.

6. The method of claim 5 in which at least one of the first and second masking members comprise a plurality of masking member segments assembled into a masking member.

7. The method of claim 5 in which:

at least one external surface of a segment includes a protrusion;

a masking member disposed on the external surface includes a recess shaped to receive the protrusion; and, the masking member and external surface are disposed so that the protrusion is disposed within the recess.

* * * * *